US012022770B2

United States Patent
Boyles

(10) Patent No.: US 12,022,770 B2
(45) Date of Patent: Jul. 2, 2024

(54) COUPLER FOR A TOOL

(71) Applicant: TTI (MACAO COMMERCIAL OFFSHORE) LIMITED, Macau (MO)

(72) Inventor: Tyler W. Boyles, Easley, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 846 days.

(21) Appl. No.: 16/280,799

(22) Filed: Feb. 20, 2019

(65) Prior Publication Data

US 2019/0269069 A1 Sep. 5, 2019

Related U.S. Application Data

(60) Provisional application No. 62/637,793, filed on Mar. 2, 2018.

(51) Int. Cl.
*F16B 7/04* (2006.01)
*A01D 34/416* (2006.01)
*B25G 1/04* (2006.01)

(52) U.S. Cl.
CPC .............. *A01D 34/416* (2013.01); *B25G 1/04* (2013.01); *F16B 7/0406* (2013.01); *F16B 7/0426* (2013.01)

(58) Field of Classification Search
CPC .......... F16B 2/065; F16B 7/0426; F16B 2/06; F16B 7/06; F16B 7/0406; Y10T 403/5713;

(Continued)

(56) References Cited

U.S. PATENT DOCUMENTS 5,241 A 8/1847 Rice
1,248,558 A * 12/1917 Scribner ............... F16L 37/252
285/70

(Continued)

FOREIGN PATENT DOCUMENTS

CN 101405050 A 4/2009
CN 202560850 U 11/2012

(Continued)

OTHER PUBLICATIONS

European Patent Office Extended Search Report for Application No. 19160006.3 dated Oct. 11, 2019 (7 pages).

(Continued)

*Primary Examiner* — Amber R Anderson
*Assistant Examiner* — Zachary A Hall
(74) *Attorney, Agent, or Firm* — Michael Best & Friedrich LLP

(57) ABSTRACT

A shaft coupler, a tool and a method of assembling a tool. The shaft coupler may generally include substantially identical coupling members operable to couple two shaft segments of a tool. The shaft coupler may include a first coupling member including a first body having a first coupling end and an opposite first shaft end defining a first opening configured to receive a first shaft segment; and a second coupling member including a second body having a second coupling end and an opposite second shaft end defining a second opening configured to receive a second shaft segment. The first coupling member and the second coupling member may be identical. The first coupling end may be configured to engage the second coupling end to selectively couple the first coupling member to the second coupling member and, thereby, the first shaft segment to the second shaft segment.

14 Claims, 11 Drawing Sheets

(58) Field of Classification Search
CPC ......... Y10T 403/5761; Y10T 403/5786; Y10T 403/7045; B25G 1/04; A01D 34/412; A01D 34/416; A01D 34/4162; A01D 34/4165; A01D 34/42; A01D 34/46; A01D 34/535; A01D 34/56; A01D 46/24; A01D 46/247; A01D 46/253; F16L 23/032; F16L 23/036; F16D 1/033; F16D 1/02
USPC ........................................ 285/65, 70; 30/276
See application file for complete search history.

(56) References Cited

U.S. PATENT DOCUMENTS

| | | | |
|---|---|---|---|
| 2,555,226 A | 5/1951 | Draughn | |
| 2,559,741 A * | 7/1951 | Wachsmann | E04B 1/5843 403/302 |
| 2,818,291 A * | 12/1957 | Corns | B25G 1/06 403/102 |
| 3,419,931 A | 1/1969 | Willig | |
| 3,858,836 A * | 1/1975 | Marcyan | G01B 5/0002 403/313 |
| 3,922,481 A * | 11/1975 | Lewis | H02G 7/12 403/97 |
| 4,282,652 A | 8/1981 | Ballas, Sr. | |
| 4,463,498 A | 8/1984 | Everts | |
| 4,578,608 A * | 3/1986 | Mech | H02K 5/132 403/364 |
| 5,802,724 A | 9/1998 | Rickard et al. | |
| 5,809,653 A | 9/1998 | Everts et al. | |
| 5,810,408 A | 9/1998 | Armstrong | |
| 5,947,388 A | 9/1999 | Woodruff | |
| 6,065,275 A * | 5/2000 | Pope | A01D 34/001 280/47.24 |
| 6,352,385 B1 * | 3/2002 | Wojciechowski | F16D 1/033 403/364 |
| 6,474,747 B2 | 11/2002 | Beaulieu et al. | |
| 6,557,878 B2 * | 5/2003 | Chen | B62K 19/36 280/226.1 |
| 6,669,155 B2 * | 12/2003 | Ron | A01D 34/001 280/47.24 |
| 8,397,463 B2 * | 3/2013 | Allred, III | F16B 11/008 52/696 |
| 8,579,537 B2 | 11/2013 | VanLandingham et al. | |
| 9,371,108 B2 * | 6/2016 | Bettin | B62K 15/006 |
| 10,155,305 B2 | 12/2018 | Tzeng | B25G 1/005 |
| 10,508,667 B2 | 12/2019 | Bianchi | B62K 15/006 |
| 11,013,312 B2 * | 5/2021 | Staniszewski | A46B 5/0041 |
| 2016/0021819 A1 | 1/2016 | Nakano et al. | |
| 2016/0088792 A1 * | 3/2016 | Yamaoka | A01D 34/733 30/276 |
| 2020/0008348 A1 * | 1/2020 | Guo | A01D 34/4166 |

FOREIGN PATENT DOCUMENTS

| | | | |
|---|---|---|---|
| CN | 103016553 A | 4/2013 | |
| CN | 206016069 U * | 3/2017 | ............ F16B 7/182 |
| EP | 0822036 B1 | 5/2003 | |
| EP | 2814641 A1 | 12/2014 | |
| WO | 9607516 A1 | 3/1996 | |
| WO | WO-2010099569 A1 * | 9/2010 | ............ B65D 11/00 |
| WO | 2013122267 A1 | 8/2013 | |

OTHER PUBLICATIONS

Chinese Patent Office Action for Application No. 201910149513.1 dated Jun. 2, 2021 (8 pages including statement of relevance).
Mexican Patent Office Action for Application No. MX/a/2019/002475 dated Oct. 17, 2022 (4 pages including statement of relevance).

* cited by examiner

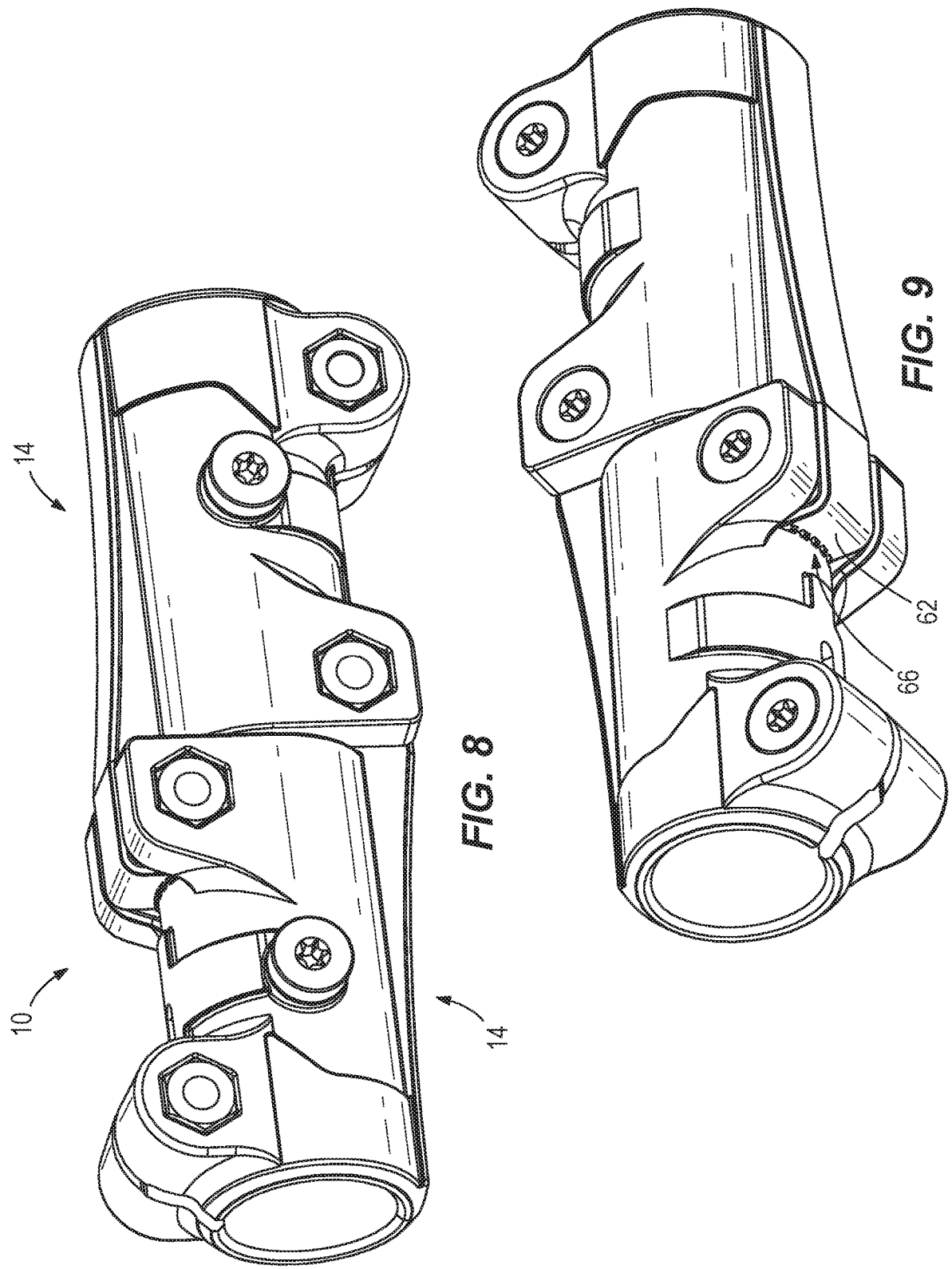

COUPLER FOR A TOOL

CROSS-REFERENCE TO RELATED APPLICATION

This application claims the benefit of co-pending, prior-filed U.S. Provisional Patent Application No. 62/637,793, filed Mar. 2, 2018, the entire contents of which are incorporated by reference.

FIELD

The invention generally relates to couplers for connecting two shafts, and, more particularly, to a shaft coupler for a tool, such as an outdoor tool, a power tool, etc.

BACKGROUND

Tools, such as outdoor tools (e.g., a trimmer, an edger, a pole saw, etc.), power tools, etc., may include an elongated shaft. The shaft may include a number of separate shaft segments which can be coupled and decoupled, for example, for shipping, storage, exchange of operational heads, etc. Shaft couplers are often used to connect adjacent shaft segments. Existing shaft couplers generally include unique coupling members requiring separate tooling and manufacturing methods to produce.

SUMMARY

In one independent aspect, a shaft coupler may be operable to couple two shaft segments of a tool and may generally include a first coupling member including a first body having a first coupling end and an opposite first shaft end defining a first opening configured to receive a first shaft segment; and a second coupling member including a second body having a second coupling end and an opposite second shaft end defining a second opening configured to receive a second shaft segment. The first coupling member and the second coupling member may be identical. The first coupling end may be configured to engage the second coupling end to selectively couple the first coupling member to the second coupling member and, thereby, the first shaft segment to the second shaft segment.

In some constructions, each coupling end includes spaced apart coupling flanges and a coupling projection, the coupling flanges of the first coupling member receiving the coupling projection of the second coupling member, and the coupling flanges of the second coupling member receiving the coupling projection of the first coupling member. A fastener may extend through at least one coupling flange and the coupling projection to couple the first coupling member and the second coupling member. Each coupling projection may have a locating surface with ribs engageable with complementary ribs on a locating surface between the associated coupling flanges.

In another independent aspect, a tool may generally include a shaft assembly with a first shaft segment and a separate second shaft segment; a handle connected to the first shaft segment; an operational member connected to the second shaft segment; and a shaft coupler operable to selectively connect the first shaft segment and the second shaft segment. The shaft coupler may generally include a first coupling member including a first body having a first coupling end and an opposite first shaft end defining a first opening configured to receive the first shaft segment; and a second coupling member including a second body having a second coupling end and an opposite second shaft end defining a second opening configured to receive the second shaft segment. The first coupling member and the second coupling member may be identical. The first coupling end may be configured to engage the second coupling end to selectively couple the first coupling member to the second coupling member and, thereby, the first shaft segment to the second shaft segment.

In yet another independent aspect, a method of assembling a tool may be provided. The tool may include a shaft assembly with a first shaft segment and a separate second shaft segment, a handle connected to the first shaft segment, and an operational member connected to the second shaft segment. The method may generally include connecting a first coupling member to the first shaft segment; connecting an identical second coupling member to the second shaft segment; and coupling the first coupling member to the second coupling member.

Other independent aspects of the invention may become apparent by consideration of the detailed description, claims and accompanying drawings.

BRIEF DESCRIPTION OF THE DRAWINGS

FIG. 8 is a perspective view of the coupler of FIG. 2.

FIG. 9 is another perspective view of the coupler of FIG. 2.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, condition, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 1:
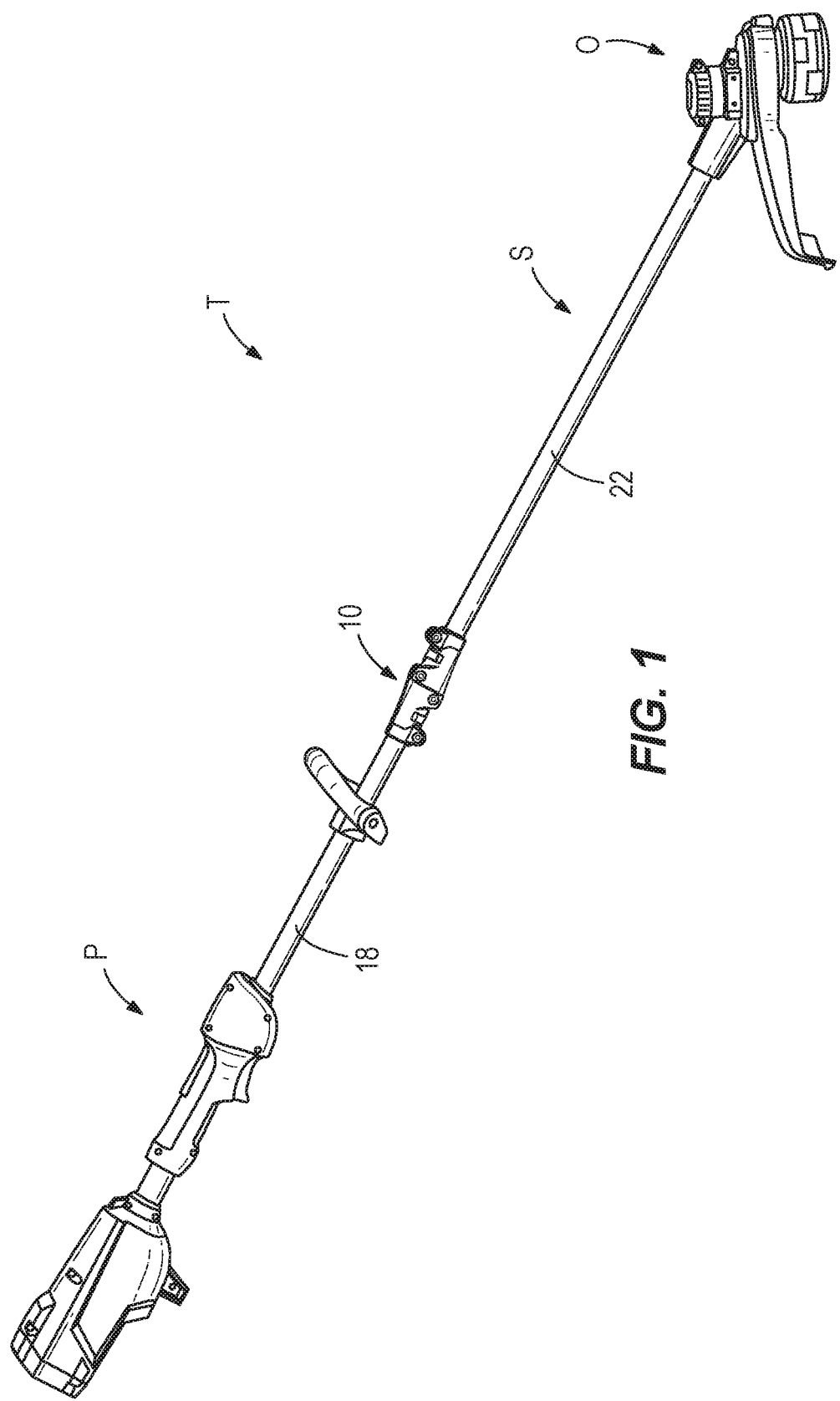
FIG. 1 is a perspective view of a tool, such as an outdoor tool, a power tool, a non-motorized tool or implement, etc., including a coupler.

FIG. 1 illustrates a tool T including an elongated shaft assembly S, extending along an axis A, and a coupler 10 including substantially identical coupling members 14 operable to couple shaft segments 18, 22. The illustrated tool T includes a string trimmer. In other constructions (not shown), the tool may include another outdoor tool (e.g., a pole saw, a hedge trimmer, etc.), a power tool, a non-motorized tool or implement (e.g., a pruner, a shovel, a rake, etc.), etc. In other constructions (not shown), the tool T may include more than two shaft segments and a coupler 10 for each pair of shaft segments.

The illustrated tool T includes, on one shaft segment 18, a handle portion with, in the illustrated construction, a powerhead unit P (e.g., a power source (a battery pack), an actuator, etc.), and, on the other shaft segment 22, an operational unit O (e.g., a driven unit (motor), a driven member, etc.). The coupling members 14 selectively and removably couple the shaft segments 18, 22 to couple the handle portion (and powerhead unit P) to the operational unit O. In other constructions (not shown), components of the operational unit O (e.g., the motor) may be provided with the powerhead unit P on the same end of the tool T and vice versa.

The coupler 10 may allow the powerhead unit P to be interchangeably connected to multiple different operational units O. Additionally, the coupler 10 may allow the powerhead unit P to be disconnected from the operational unit O to reduce packaging, storage size, etc. of the tool T.

Figure 2:
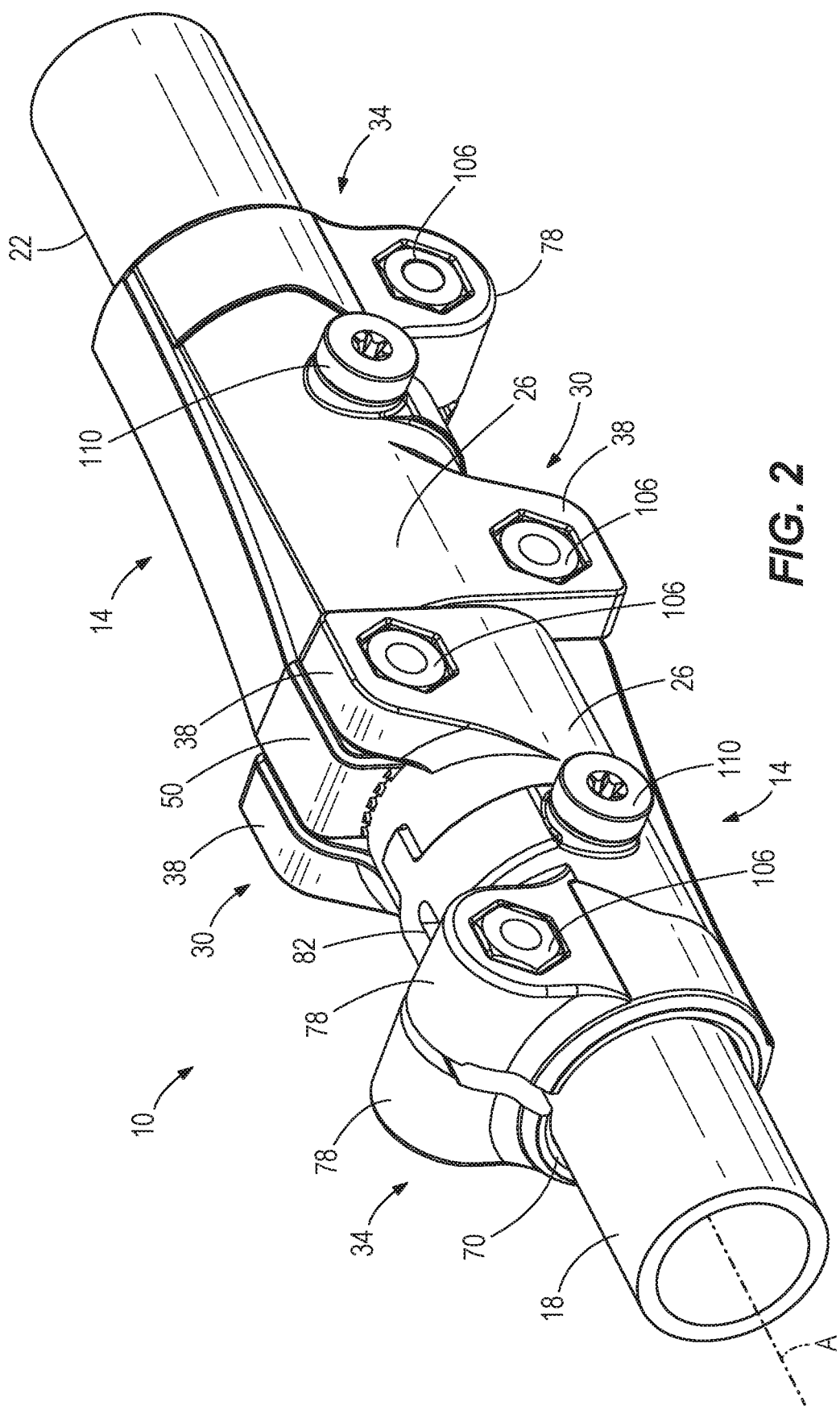
FIG. 2 is a perspective view of a coupler of FIG. 1.
Figure 3:
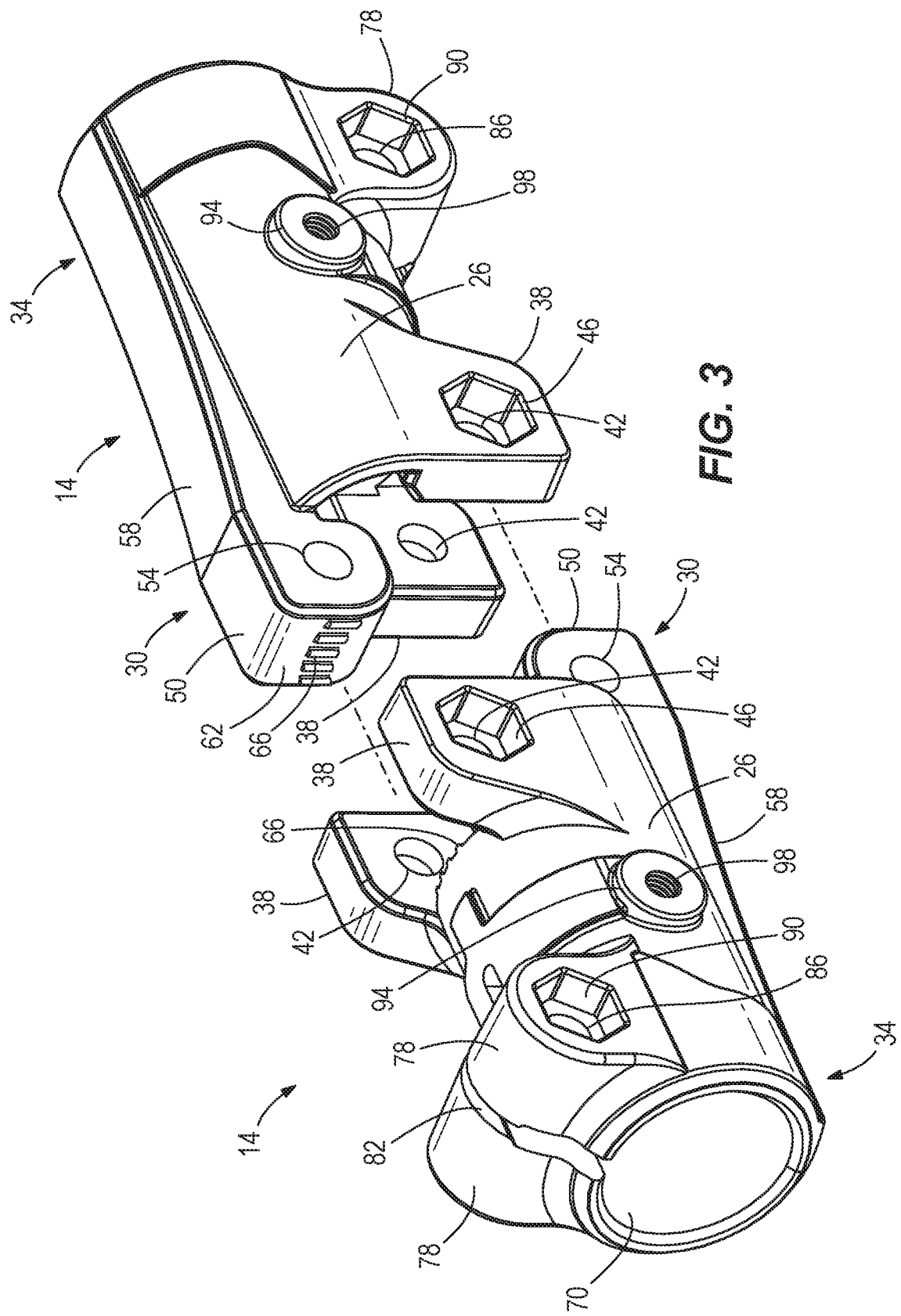
FIG. 3 is a perspective view of separated coupling members of the coupler of FIG. 2.

As mentioned above, the coupling members 14 are substantially identical, thereby requiring only a single part to be manufactured to reduce costs. In other words, while there may be some differences between coupling members 14, each coupling member 14 is constructed to be able to be substituted for another. With reference to FIGS. 2 and 3, each coupling member 14 includes a body 26 with a coupling end 30, connectable to the other coupling member 14, and a shaft end 34 supporting the associated shaft segment 18, 22.

The coupling end 30 includes spaced-apart coupling flanges 38, each defining an aperture 42 with an associated recess 46, and a coupling projection 50 with an aperture 54 and a radial projecting portion 58 for support, reinforcement, etc. Cooperating locating surfaces 62, with inter-engaging ribs 66, are provided between the flanges 38 and on the facing end of the projection 60.

The shaft end 34 defines an axial opening 70 for receiving the associated shaft segment 18, 22. The coupling flanges 38 provide respective tapered stop surfaces 74 for limiting insertion the shaft segment 18, 22. Clamping flanges 78 are separated by a clamping slot 82. Each clamping flange 78 defines an aperture 86 with a recess 90. A boss 94 defines a threaded opening 98 extending into the shaft opening 70 and intersecting the axis A.

Figure 4:
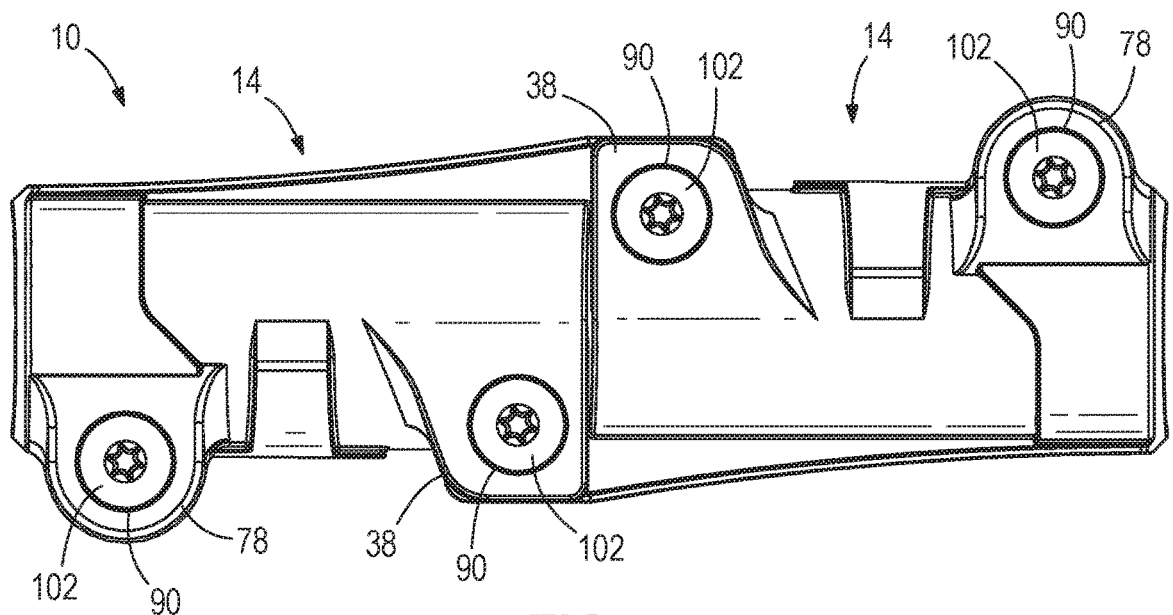
FIG. 4 is a side view of the coupler of FIG. 2.
Figure 5:
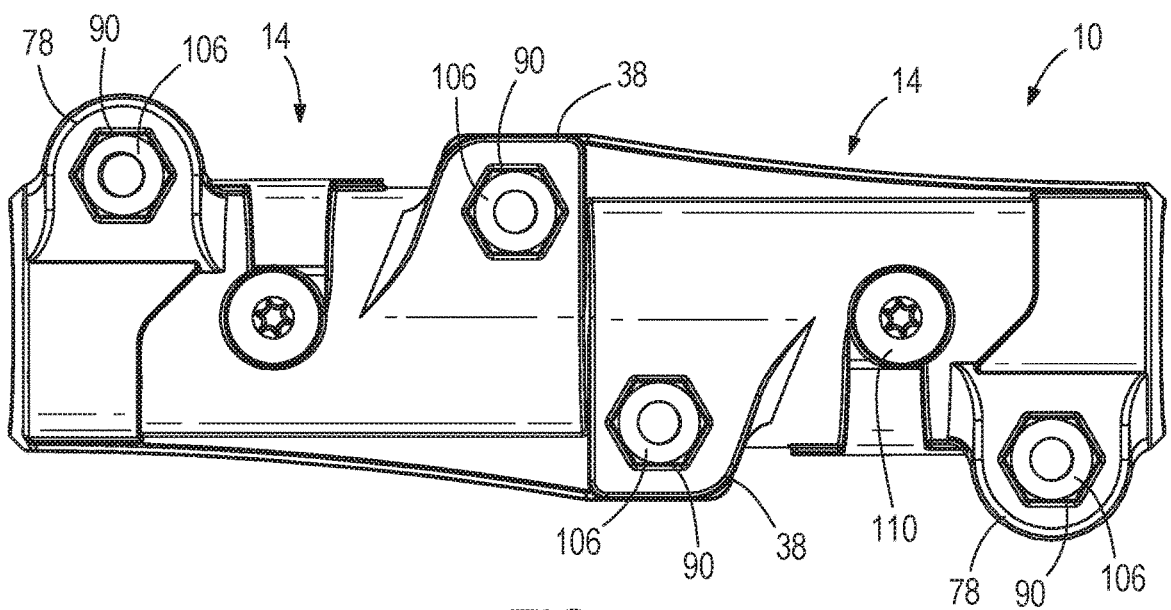
FIG. 5 is another side view of the coupler of FIG. 2.
Figure 6:
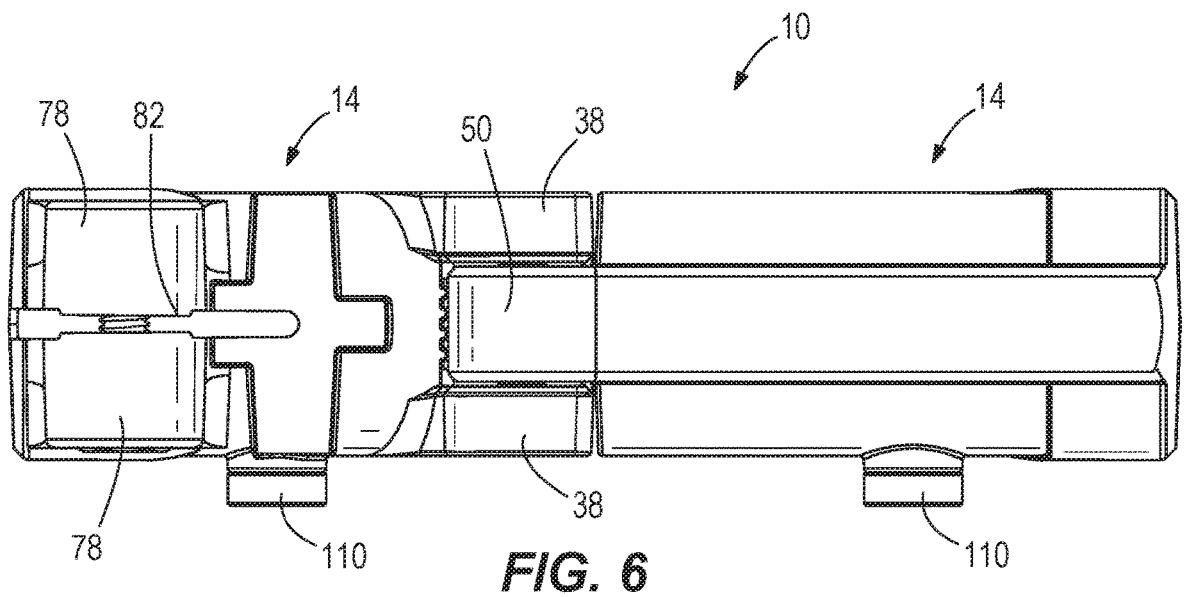
FIG. 6 is a top view of the coupler of FIG. 2.
Figure 7:
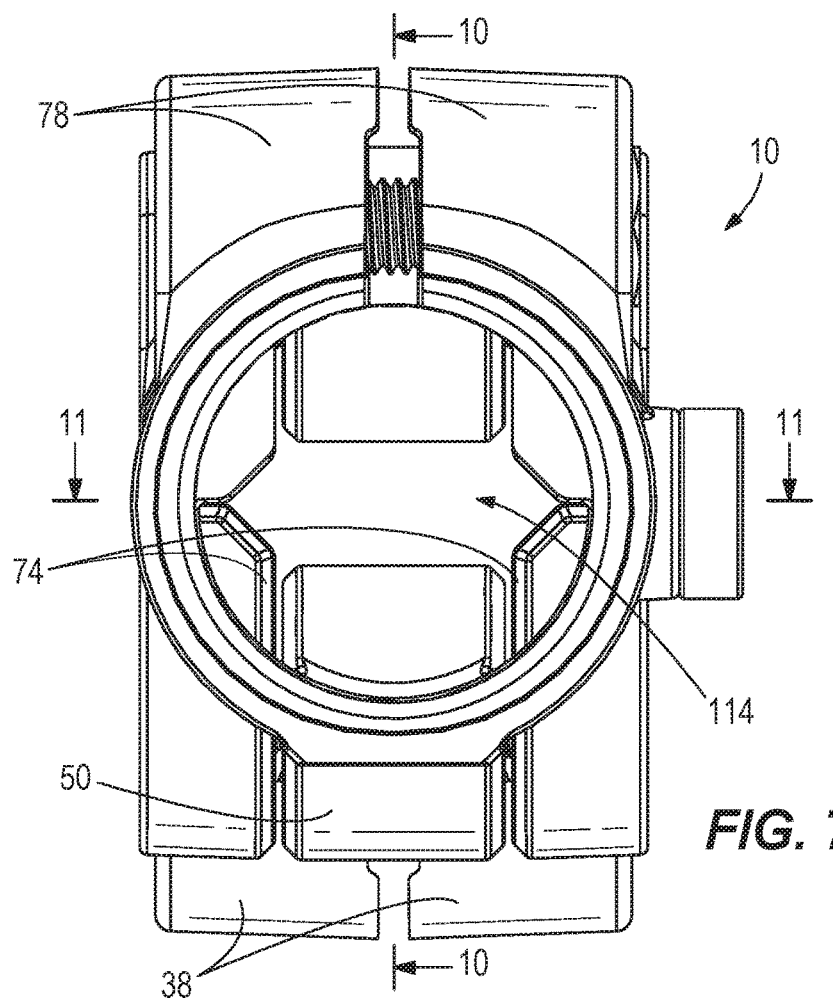
FIG. 7 is an end view of the coupler of FIG. 2.
Figure 10:
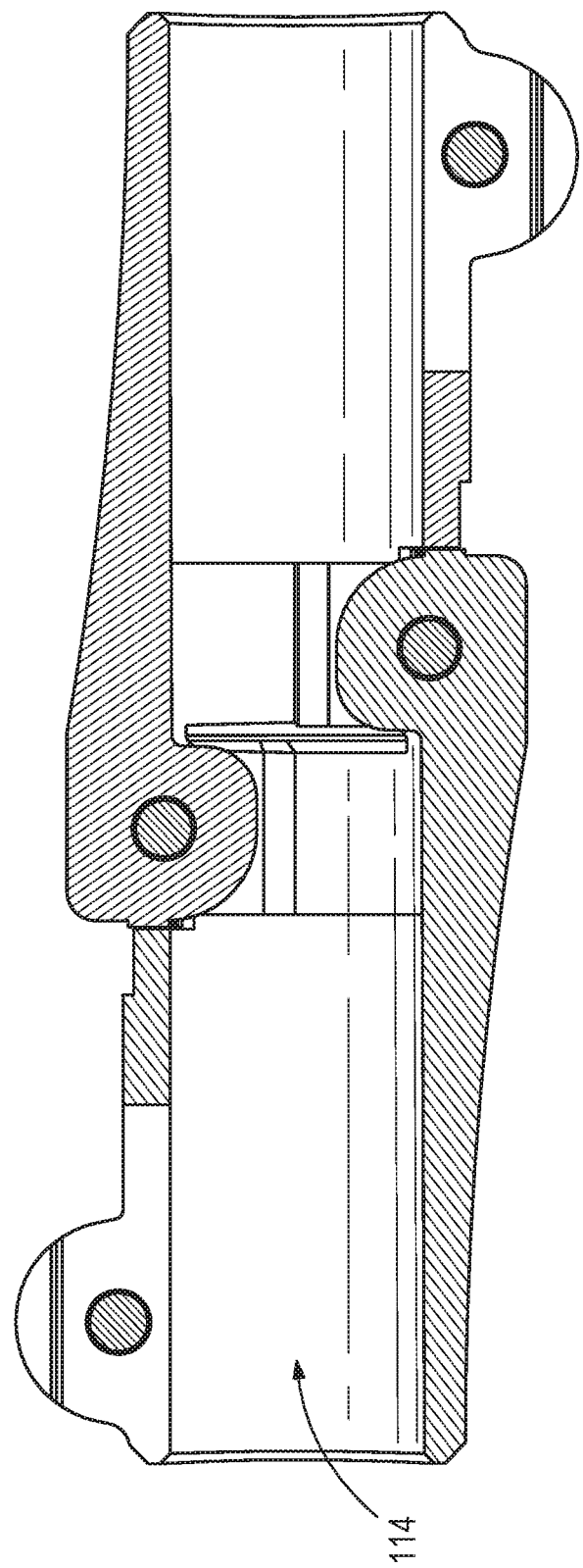
FIG. 10 is a cross-sectional view of the coupler of FIG. 2.
Figure 11:
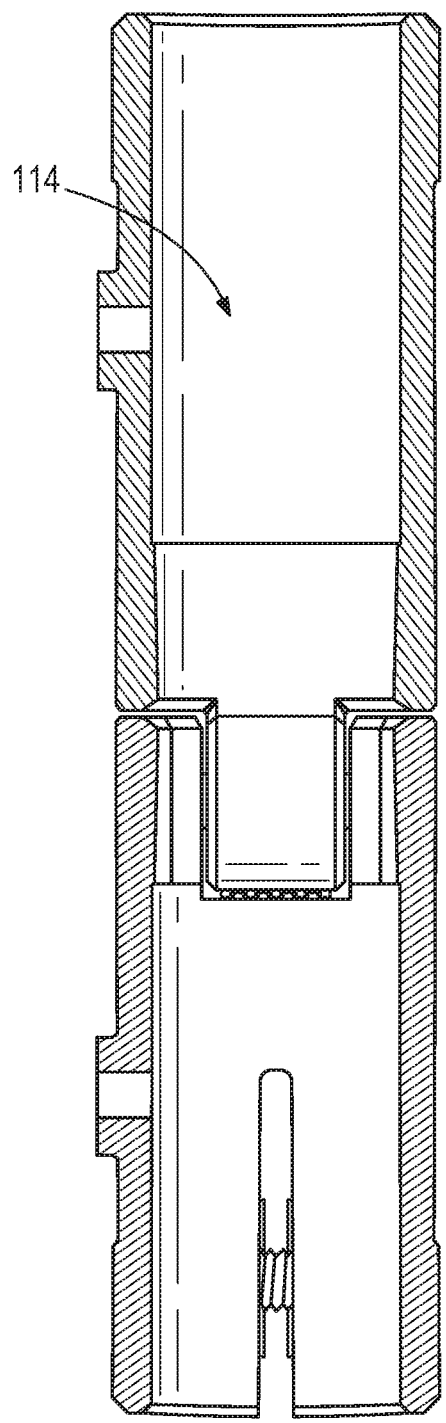
FIG. 11 is another cross-sectional view of the coupler of FIG. 2.
Figure 12:
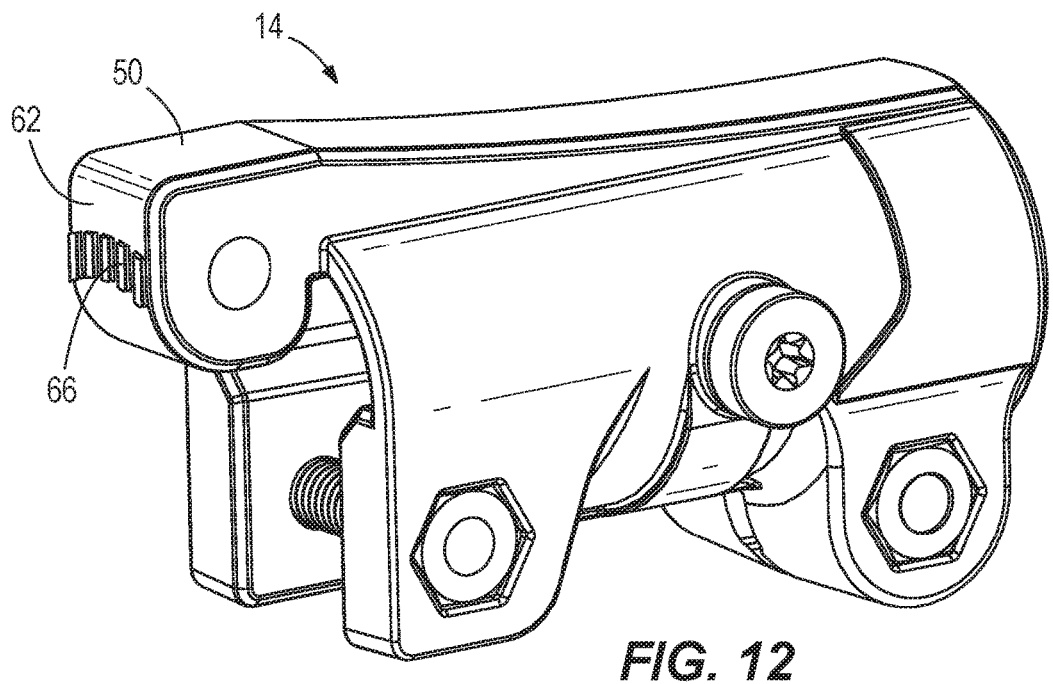
FIG. 12 is a perspective end view of a coupling member of the coupler of FIG. 2.
Figure 13:
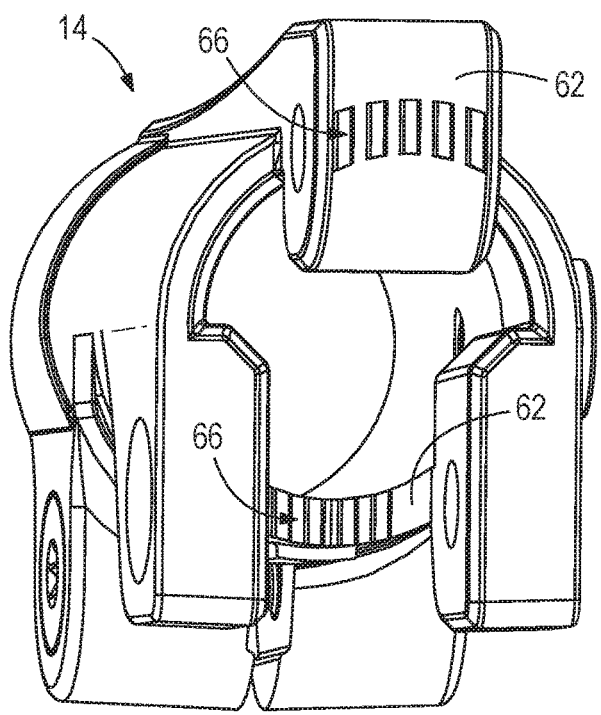
FIG. 13 is another perspective end view of the coupling member of FIG. 12.
Figure 14:
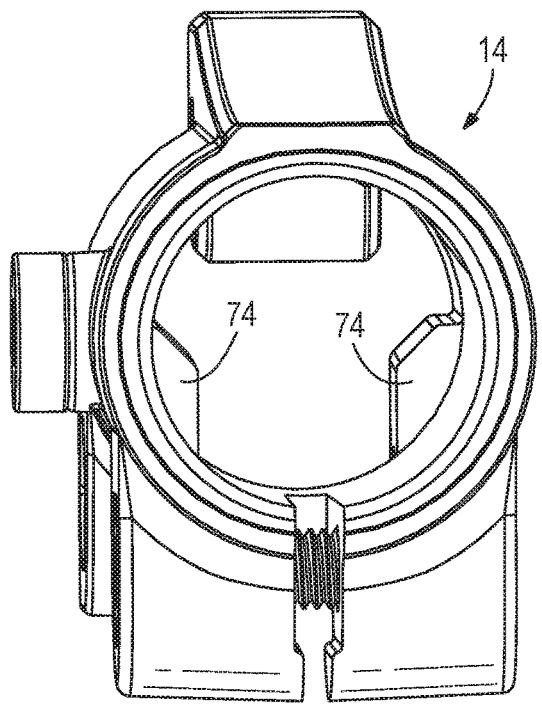
FIG. 14 is a perspective view of an opposite end of the coupling member of FIG. 12.
Figure 15:
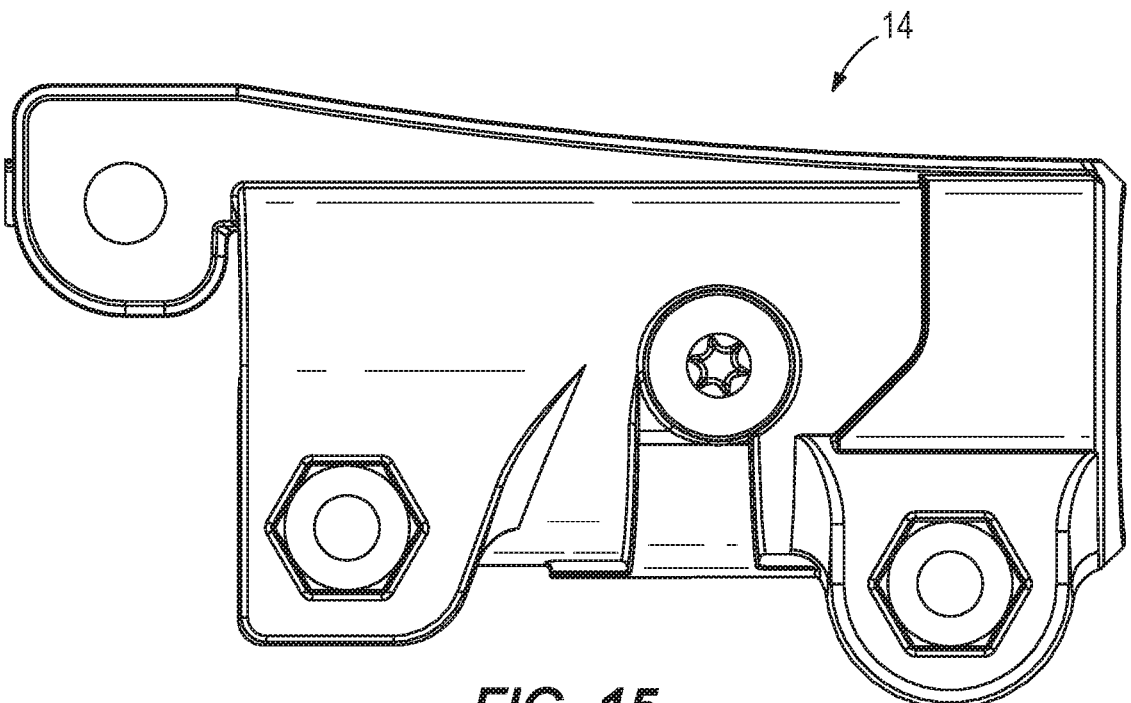
FIG. 15 is a side view of the coupling member of FIG. 12.
Figure 16:
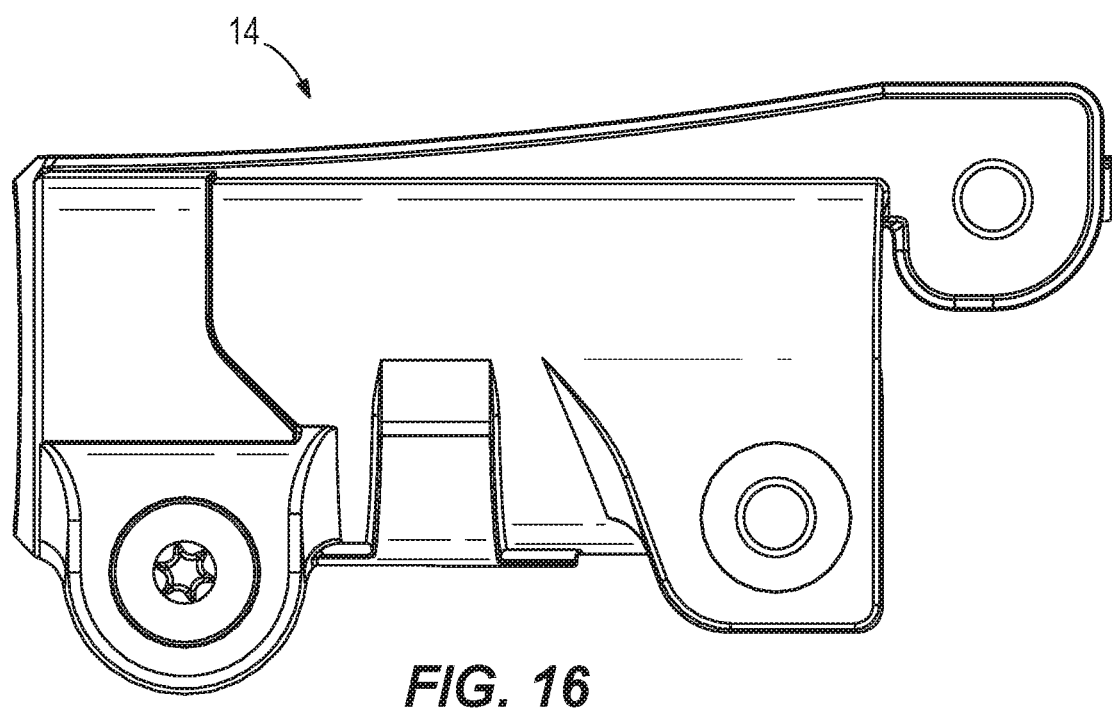
FIG. 16 is another side view of the coupling member of FIG. 12.
Figure 17:
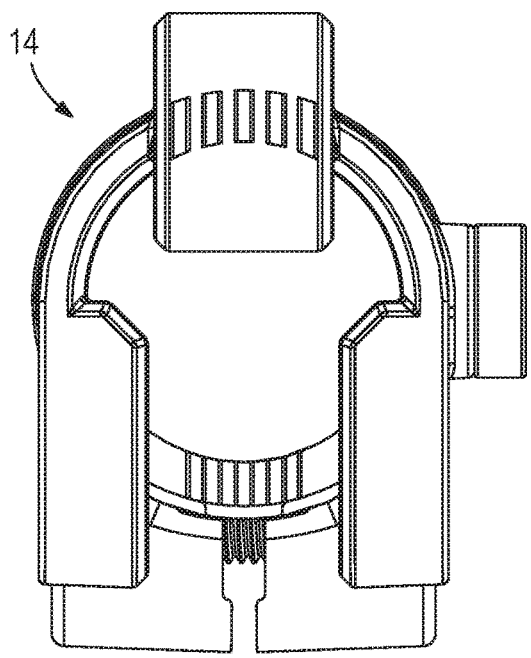
FIG. 17 is an end view of the coupling member of FIG. 12.
Figure 18:
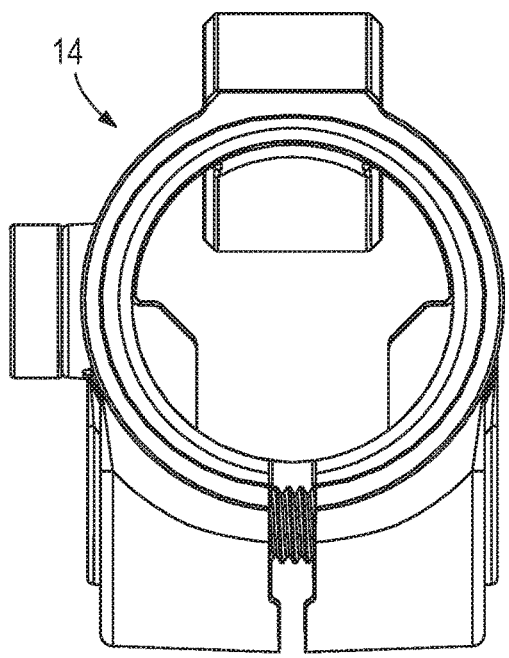
FIG. 18 is another end view of the coupling member of FIG. 12.
Figure 19:
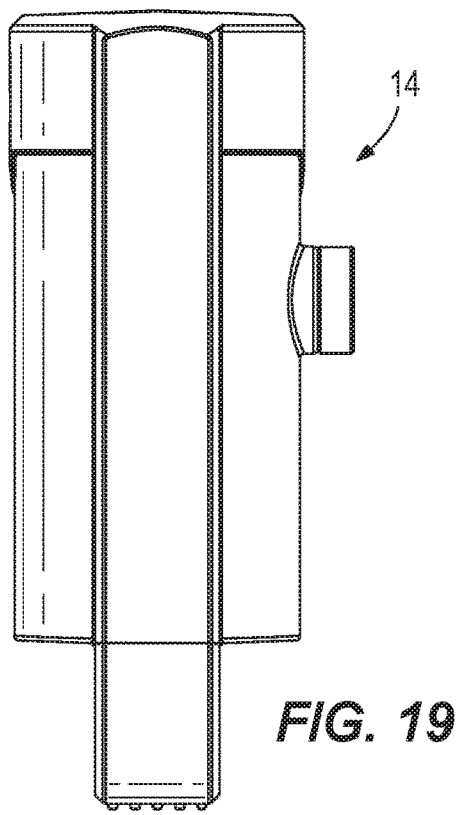
FIG. 19 is a top view of the coupling member of FIG. 12.
Figure 20:
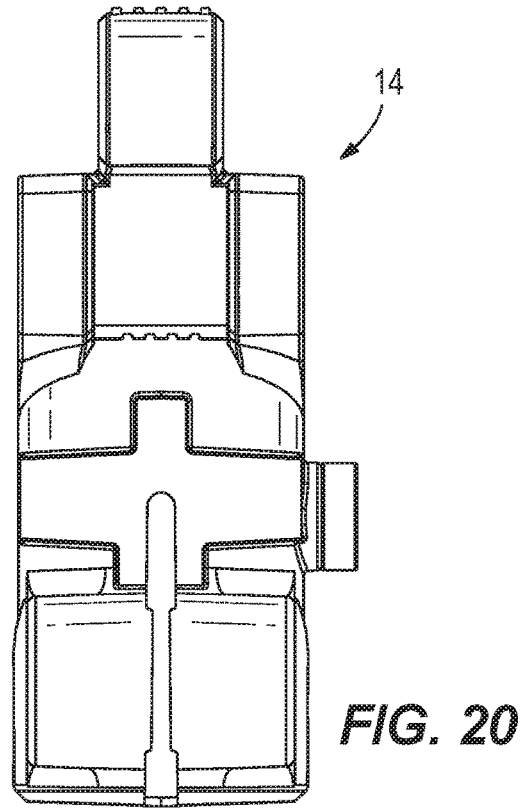
FIG. 20 is a bottom view of the coupling member of FIG. 12.

With reference to FIGS. 4 and 5, fasteners (e.g., a bolt 102 and a nut 106) are provided for coupling and clamping in the coupling members 14. A retaining fastener 110 is received in the opening 98 to positively retain the shaft segment 18, 22. In other constructions (not shown), the fastener(s) may include quick-type fasteners (e.g., spring-loaded pins, ¼ turn fasteners, bayonet fasteners, etc.).

To assemble, a coupling member 14 is installed on each shaft segment 18, 22 (see FIG. 2). The shaft segment 18, 22 is inserted into the shaft opening 70 until engaging the stop surfaces 74. The clamping fastener is adjusted to clamp the coupling member 14 to the shaft segment 18, 22. The nut 106 is rotationally fixed in the hexagonal-shaped recess 90, and the head of the bolt 102 is received and rotatable in the circular recess 90 to adjust (e.g., increase or decrease) the clamping force.

The retaining fastener 110 threads into the opening 98 to engage the shaft segment 18, 22 (e.g., a recess) to, for example, positively retain, circumferentially orient the shaft segment 18, 22. In some constructions (not shown), the shaft segment(s) 18, 20 may include a number of circumferentially spaced recesses engageable with the fastener 110 with the shaft segment 18, 20 in a number of orientations of the powerhead unit P relative to the operational unit O.

The coupling members 14 are oriented with the coupling projection 50 of one coupling member 14 positioned to be received in the gap between the coupling flanges 38 of the other coupling member 14 and vice versa. The coupling members 14 are positioned with the locating surfaces 62 and the ribs 66 engaged and the apertures 42, 54 aligned. The coupling fasteners are installed through the apertures 42, 54 and adjusted. The nut 106 is rotationally fixed in the hexagonal-shaped recess 90, and the head of the bolt 102 is received and rotatable in the circular recess 90 to fix the coupling members 14.

When assembled, the coupling members 14 align the shaft segments 18, 22 along the axis A. The assembled coupling members 14 define a passageway 114 therethrough which may accommodate connecting structure (not shown) between the powerhead unit P and the operational unit O (e.g., one or more electrical wires or conductors, drive members, etc.).

One or more independent features and/or independent advantages of the invention may be set forth in the following claims:

What is claimed is:

1. A shaft coupler operable to couple two shaft segments of a tool, the shaft coupler comprising:
   a first coupling member including a first body having a first coupling end and an opposite first shaft end defining a first opening configured to receive a first shaft segment; and
   a second coupling member including a second body having a second coupling end and an opposite second shaft end defining a second opening configured to receive a second shaft segment;
   wherein the first coupling end is configured to engage the second coupling end to selectively couple the first coupling member to the second coupling member and, thereby, the first shaft segment to the second shaft segment;
   wherein each of the first coupling end and the second coupling end includes spaced apart coupling flanges and a coupling projection protruding separately from the coupling flanges, the coupling flanges of the first coupling member receiving the coupling projection of the second coupling member, and the coupling flanges of the second coupling member receiving the coupling projection of the first coupling member;
   wherein each coupling flange and each coupling projection defines an aperture;
   wherein a first coupling fastener extends through the aperture of one of the coupling flanges of the first coupling member and through the aperture of the associated coupling projection of the second coupling member, and a second coupling fastener extends through the aperture of one of the coupling flanges of the second coupling member and through the aperture of the associated coupling projection of the first coupling member; and
   wherein each coupling projection includes a first locating surface with ribs engageable with complementary ribs on a second locating surface between the associated coupling flanges.

2. The shaft coupler of claim 1, wherein the coupling fastener includes a bolt and a nut, and wherein the at least one coupling flange includes a recess within which the nut is rotationally fixed.

3. The shaft coupler of claim 1, wherein the coupling flanges provide respective tapered stop surfaces for limiting insertion of each shaft segment.

4. The shaft coupler of claim 1, wherein the assembled coupling members align the shaft segments along an axis.

5. The shaft coupler of claim 1, wherein each of the first shaft end and the second shaft end includes spaced apart clamping flanges separated by a clamping slot.

6. The shaft coupler of claim 5, wherein each of the first shaft end and the second shaft end includes a retaining fastener to positively retain the associated shaft segment.

7. The shaft coupler of claim 1, wherein the first coupling member and the second coupling member are identical.

8. A tool comprising:
   a shaft assembly with a first shaft segment and a separate second shaft segment;
   a handle connected to the first shaft segment;
   an operational member connected to the second shaft segment; and
   a shaft coupler operable to selectively connect the first shaft segment and the second shaft segment, the shaft coupler including
   a first coupling member including a first body having a first coupling end and an opposite first shaft end defining a first opening configured to receive the first shaft segment; and
   a second coupling member including a second body having a second coupling end and an opposite second shaft end defining a second opening configured to receive the second shaft segment,
   wherein the first coupling end is configured to engage the second coupling end to selectively couple the first coupling member to the second coupling member and, thereby, the first shaft segment to the second shaft segment;
   wherein each of the first coupling end and the second coupling end includes a receiving portion and an insertion portion protruding separately from the receiving portion, the receiving portion of the first coupling member receiving the insertion portion of the second coupling member, and the receiving portion of the second coupling member receiving the insertion portion of the first coupling member;
   wherein the receiving portion of at least one of the coupling members defines a stop surface facing toward the corresponding one of the first shaft end or the second shaft end and configured to engage the first shaft segment or the second shaft segment to limit insertion of the corresponding shaft segment into the at least one coupling member;
   wherein each receiving portion comprises spaced apart coupling flanges and each insertion portion comprises a coupling projection, the coupling flanges of the first coupling member receiving the coupling projection of the second coupling member, and the coupling flanges of the second coupling member receiving the coupling projection of the first coupling member;
   wherein each coupling projection includes a first locating surface with ribs engageable with complementary ribs on a second locating surface between the associated coupling flanges.

9. The tool of claim 8, wherein a coupling fastener extends through at least one of the coupling flanges and an associated coupling projection to couple the first coupling member and the second coupling member.

10. The tool of claim 8, wherein the operational member is a first operational member, and the tool further includes a separate third shaft segment and a second operational member connected to the third shaft segment, wherein the shaft coupler further includes a third coupling member including a third body having a third coupling end and an opposite third shaft end defining a third opening configured to receive the third shaft segment, and wherein the first coupling end is further configured to engage the third coupling end to selectively couple the first coupling member to the third coupling member and, thereby, the first shaft segment to the third shaft segment.

11. The shaft coupler of claim 8, wherein the first coupling member and the second coupling member are identical.

12. A method of assembling a tool, the tool including a shaft assembly with a first shaft segment and a separate second shaft segment, a handle connected to the first shaft segment, and an operational member connected to the second shaft segment, the method comprising:
   connecting a first coupling member to the first shaft segment;
   connecting a second coupling member to the second shaft segment; and coupling the first coupling member to the second coupling member;
wherein the first coupling member includes a first body having a first coupling end and an opposite first shaft end, and wherein the second coupling member includes a second body having a second coupling end and an opposite second shaft end, wherein each coupling end includes spaced apart coupling flanges and a coupling projection protruding separately from the coupling flanges, and wherein each coupling flange and each coupling projection defines an aperture, and wherein coupling the first coupling member to the second coupling member includes
inserting the coupling projection of the second coupling member between the coupling flanges of the first coupling member,
inserting the coupling projection of the first coupling member between the coupling flanges of the second coupling member,
inserting a first coupling fastener through the aperture of one of the coupling flanges of the first coupling member and through the aperture of the associated coupling projection of the second coupling member, and
inserting a second coupling fastener through the aperture of one of the coupling flanges of the second coupling member and through the aperture of the associated coupling projection of the first coupling member;
wherein each coupling projection includes a first locating surface with first ribs, and each coupling member includes complementary second ribs on a second locating surface between the associated coupling flanges; and
wherein coupling the first coupling member to the second coupling member further includes engaging the first ribs with the second ribs.

13. The method of claim 12, wherein the operational member is a first operational member, and the tool further includes a separate third shaft segment and a second operational member connected to the third shaft segment, and the method further comprises:
connecting an identical third coupling member to the third shaft segment;
uncoupling the first coupling member from the second coupling member; and
coupling the first coupling member to the third coupling member.

14. The method of claim 12, wherein the first coupling member and the second coupling member are identical.

* * * * *